Patented Jan. 26, 1932

1,843,051

UNITED STATES PATENT OFFICE

FRIEDRICH WILHELM THIELE, OF HAMBURG, GERMANY, ASSIGNOR TO HANSEATISCHE MUHLENWERKE AKTIENGESELLSCHAFT, OF HAMBURG, GERMANY, A JOINT-STOCK COMPANY OF GERMANY

BAKING COMPOSITION AND MODE OF PREPARING SAME

No Drawing. Application filed September 1, 1928, Serial No. 303,609, and in Germany June 14, 1928.

The present invention relates to improvements in auxiliary agents to be used in baking.

The application of diastatic extracts and of malt-flour as an assistant in baking in order to improve the action of yeast or leaven used as a raising means is well known. By such an addition to the dough an increased yield of bakers' products, by as much as 10 per cent may be obtained.

I have now found that much better results can be attained if an addition of lecithin, particularly of vegetable lecithin such as is obtained in abundant quantities at a reasonable price from soy-beans, is made to the flour to be used for the preparation of the dough. As observed the increase of the bakers' products by an addition of 1 per cent of vegetable lecithin to the dry flour used for preparing the dough, amounts to as much as 40 per cent. The dough can then be prepared from this treated flour, following the usual and customary method of making dough from flour. The dough is baked as usual.

This favorable action is to be attributed to the fact that the phosphatides promote the nourishment of the yeast, whence there is produced an increased quantity of carbonic acid which occurs during the warming up of the dough in the oven. At the same time there is produced by the emulsifying property of the lecithin, an increased dilatableness of the gluten, which supports the maintenance of the sponge produced by the action of the carbonic acid bubbles.

In order to further promote the development of the yeast cells, the application of the phosphatides may take place in combination with suitable carbohydrates adapted for their nourishment, for example by adding maltflour or diastatic extracts in the proportion of one part of lecithin from soy-beans and one part of malt-flour to one hundred parts of dry flour.

The addition of vegetable lecithin as a baking assistant in the baking process cannot be compared with the customary use of eggs in bakers' products. The said improved baking assistant may especially be used for the preparation of brown and white bread for which eggs are not used. But also with those bakers' products in the preparation of which eggs are used, there is a great difference, because one can never add as many eggs to the dough to obtain the same effect, because the bakers' product would then become too yellow and too rich. Moreover, egg yolk contains in addition to the lecithin, greatly predominating quantities of albumin which would coagulate the bakers' product and make the same dry.

Owing to the desirable effect attained by the addition of vegetable phosphatides, there is an excellent means at command for using or employing also flour of the kinds rich in albumin, in larger quantities mixed with corn-flour for the preparation of bakers' products.

The vegetable phosphatides may be rubbed into the flour dry, either with corn-flour or with flour of soy-beans and then mixed with the total quantity of the flour to be used for the preparation of the dough.

The said phosphatides may also be used in mixture with oil or fat, either with the oil contained in the raw phosphatides and obtained from the preparing of the latter or with further additional oil or fat.

Finally a swelling of the phosphatides may be effected by rubbing up the same with water and then incorporating the latter in the dough.

The following examples are given merely for illustration.

*Example 1.*—From 0.25% to 1% of soya bean lecithin is mixed with any common bread flour, (wheat flour alone, or a mixture of wheat flour and rye or corn flour) and the resulting mixture used instead of ordinary flour in any of the usual formulas for making bread dough, which is then allowed to rise, and baked in the usual manner.

*Example 2.*—The lecithin from soya beans is well mixed with a fatty oil and is used in the preparation of the dough according to any usual dough formula.

*Example 3.*—The soya lecithin is first mixed with water. This mixture is added in the preparation of the dough according to any desired dough formula.

I claim:

1. In making raised dough, the herein described step of incorporating a small percentage of vegetable lecithin into cereal flour, to be used for making such raised dough.

2. In making leavened dough, the herein described step of incorporating about 1% of vegetable lecithin into cereal flour, to be used for making such leavened dough.

3. In making raised dough for baking, the herein described step of incorporating a small percentage of vegetable phosphatides into the aggregate of the materials to constitute the dough.

4. In making dough, the herein described step of incorporating a small percentage of vegetable lecithin into cereal flour, to be used for making such dough.

5. A dough for baking containing added vegetable lecithin in amount not substantially above 1%.

6. A dough for baking, containing not over 1% of added vegetable phosphatides.

7. Dry flour to be used in making raised bread containing not considerably in excess of 1% of added vegetable lecithin.

8. A process of making raised dough as covered in claim 1, in which the lecithin is added in admixture with oily material.

9. In making dough for baking, the step of adding an aqueous emulsion containing a vegetable phosphatide.

10. In making dough for baking, the step of adding an aqueous emulsion containing vegetable lecithin.

11. A baking composition comprising added vegetable lecithin in a dough prepared from a flour which is high in protein.

In testimony whereof I affix my signature.

FRIEDRICH WILHELM THIELE.